United States Patent Office

3,377,712
Patented Apr. 16, 1968

3,377,712
FACEMETER
Gabriel Ladislav Farkas and Karel Hajnis, Prague,
Czechoslovakia, assignors to Ceskoslovenska
Akademie ved., Prague, Czechoslovakia
Filed Nov. 26, 1965, Ser. No. 509,922
Claims priority, application Czechoslovakia,
Dec. 28, 1964, PV. 7,369/64
6 Claims. (Cl. 33—174)

ABSTRACT OF THE DISCLOSURE

A T-shaped frame has an upright arm and a stationary transverse arm. The upright arm is provided with an elongated longitudinally extending recess. An adjustable transverse arm is journalled in the recess of the upright arm for rotation and for movement along the recess and is itself provided with a longitudinally extending elongated recess. Height-measuring members are provided on the adjustable transverse arm and are mounted for movement in the recess thereof in a plane parallel to the frame, and are also adjustable for displacement in the direction normal to this plane. A first scale extends along each of the recesses in parallelism therewith, and a second scale is provided on the adjustable transverse arm for indicating the angular position thereof with reference to the upright arm. A pointer is provided on the upright arm journalled in the recess of the same for rotation and for longitudinal movement and is adapted to cooperate with the second scale for indicating the angular position of the pointer with reference to the upright arm.

---

The invention relates to a device to be referred to as facemeter. The facemeter in accordance with the invention has been designed for measuring face deformations, more particularly deformations of the nose and lip in the case of various congenital defects, for example fissures such as occur with a so called harelip. In the case of nose deformations the device can be used to register the degree of lateral deflection of the axis of the nose bridge, the width of the two nose wings, the decline of the nose wing from the back to the front on the right and left side, the deviation of the nose ridge, the width of the nose root, and the nose length. In the case of a lip deformation, the facemeter determines the surface of the lip fissure, the lip height, the width of the oral fissure, the thickness of the red portion of the lip. The facemeter permits also to measure the face width and height.

Previously employed classical anthropological instruments and devices permit to measure the above mentioned face features and dimensions only by separate single-purpose equipment for each feature or measurement. Such measurements require much professional skill and practice.

Data about face deformations have hitherto been determined by the surgeon in a subjective manner, by estimation. There does not yet exist a universal device for the above stated measurements.

It is a general object of the invention to eliminate the drawbacks of the known state of art.

A further object of the invention is to provide a measuring device which permits a simple method of measuring the above mentioned face features and dimensions.

Still another object of the invention is to provide a facemeter which can be used for measuring and determining face deformations even by a surgeon without previous anthropometrical experience.

Another object of the invention is to provide a facemeter for simultaneously measuring by a single device all important face features and dimensions required to determine the extent of defects and face irregularities for example in the case of a fissure such as a harelip.

Stated briefly but more specifically, the object of the invention is a facemeter of which the main feature resides in the fact that it is formed by a frontal part with a spirit level and regulating screws, a facial part being arranged at right angles to the longitudinal axis of the front part, a pointer and a movable arm with slidably mounted sliding pieces being mounted slidably and rotatably in a groove of the facial part.

The facemeter in accordance with the invention incorporates several important advantages. It combines several previously used single purpose devices into a single meter and permits one to measure the depth in the central part of a face and the angle of deviation of the main parts of a nose.

The invention will be best understood from the following specification to be read in conjunction with the accompanying drawings illustrating a preferred example of embodiment.

Figure 1:
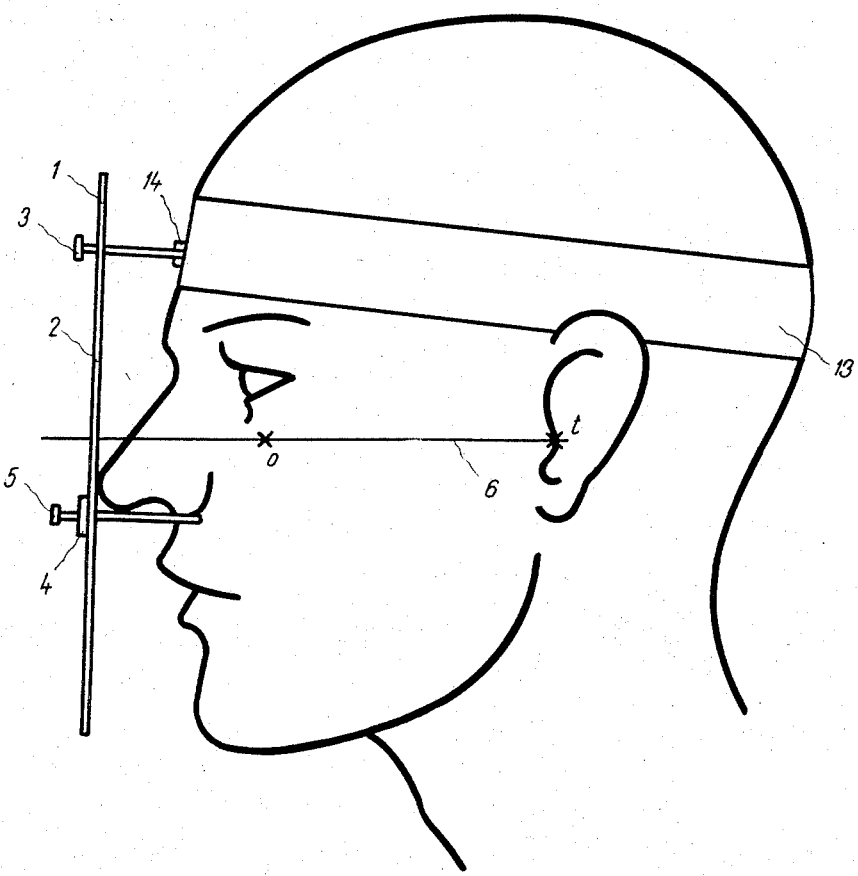
FIG. 1 is a schematic side elevation of the facemeter in accordance with the invention applied to a head.
Figure 2:
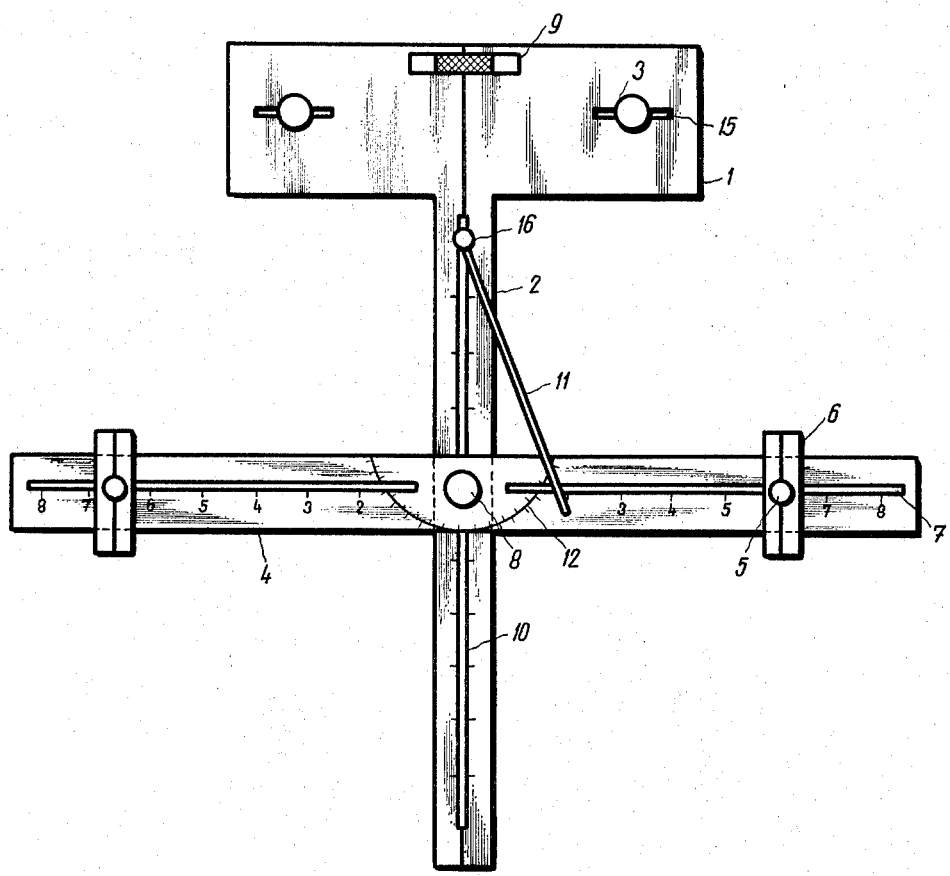
FIG. 2 is a schematic front elevation of the facemeter showing its main parts.

Referring now more particularly to the figures, it can be seen that the facemeter in accordance with the invention consists of a rigid and stationary frame or main base body having the shape of a letter T, as illustrated in detail in FIG. 2. The shorter horizontal arm of the frame will be referred to as the frontal part 1, and its longer vertical arm will be referred to as the facial part 2. The frame carries a movable horizontal arm 4. The facemeter can be attached to the head by means of a head strap 13 as shown in FIG. 1.

A more detailed description of the mentioned main parts of the facemeter will now be given.

The frontal part 1 carries spirit level 9 and adjustment screws 3 on either end which pass through slots 15 in the frontal part 1. In this manner the adjustment screws 3 can be moved in the slots either to the left or right.

The head strap 13 which serves for holding the facemeter to the head is strapped to the front as shown in FIG. 1. The strap is provided with two metal pieces, for example bearings with an internal thread 14 for receiving the adjustment screws. It should of course be understood that other modifications of the attachment of the frontal piece 1 to the head may also be used. For example, the head strap 13 may carry screws instead of bearings and these screws may pass through the slots 15 in the frontal part 1 and be attached thereto by means of nuts, and the like. The means for attaching the frontal part 1 to the head strap 13 will therefore be referred to by the more general term "adjustment and fixation means of the frontal part 1," and the means provided in the head strap to cooperate with these adjustment and fixation means of the frontal part will be referred to by the more general term "holding means of the strap 13."

The facial part 2 is provided with a longitudinal groove 10 carrying a millimeter scale. In this groove is mounted by means of an axle 16 a pointer 11 which can be moved in the groove 10 and rotated about the axle 16 as a centre of rotation.

In the groove 10 is also mounted a movable arm 4 by means of a joint 8. The arm can also be deflected from the horizontal position by rotation about the joint 8 as a centre of rotation. The movable arm 4 is provided with a horizontal longitudinal groove 7 which is provided with a millimeter scale. In the central part of the movable arm is provided an angular twin scale 12. In the groove 7 are movably mounted two sliders 6 to be referred to by the more general term sliding pieces, one piece on each end of the groove 7. The sliding pieces are provided with central holes through which pass microscrews 5.

Although the function and purpose of the various parts of the facemeter will be explained in more detail below, it may already be pointed out now that the pointer 11 is used for measuring the deviation of the nose, the scale 12 is used for measuring the deviation of the nose and of its ridge from the deflection of the movable arm 4 from the horizontal position, and the microscrews 5 are used for measuring the depth and collapse of the nose wings.

As shown in FIG. 1, the facemeter is applied to the face so that it rests against the front and nose. It must include an angle of substantially 90° with the Frankfurt horizontal and this is secured by the adjustment and fixation means of the frontal part 1, in the case considered by the adjustment screws 3 which permit one to fix the facemeter at the required angle. The spirit level 9 permits one to control the head in the required position after the facemeter has been attached thereto.

In a practical embodiment of the invention, the frontal part 1 was made of Perspex, and it had a width of 3 cm. and a length of 105 cm. The facial part had a length of 30 cm. and was also made of Perspex of a suitable thickness. The length of the pointer 11 was 8 cm. The width of the movable arm 4 was 3 cm. and its length was 22 cm. The angular scale 12 was calibrated in degrees from 0 to 35 measured from the central line. The deflection of the pointer is read on the angular scale 12 and the length dimensions of the face parts are read on the millimeter scale. The microscrews 5 can be moved forward and backward to measure the depth of the collapse of the nose wings in millimeters.

The movable arm 4 is provided in its centre with a partition line. When this line falls into the medial line of the facial part 2 of the facemeter, the movable arm 4 is parallel with the frontal part 1, or in the rest position. If the movable arm 4 is deviated from the parallel position with respect to the frontal part 1, its partition line shows on the angular scale 12 the deflection of the movable arm from the parallel position in degrees. The position of the movable arm 4 with respect to the facial part 2 is read on the scale 10.

Figure 3:
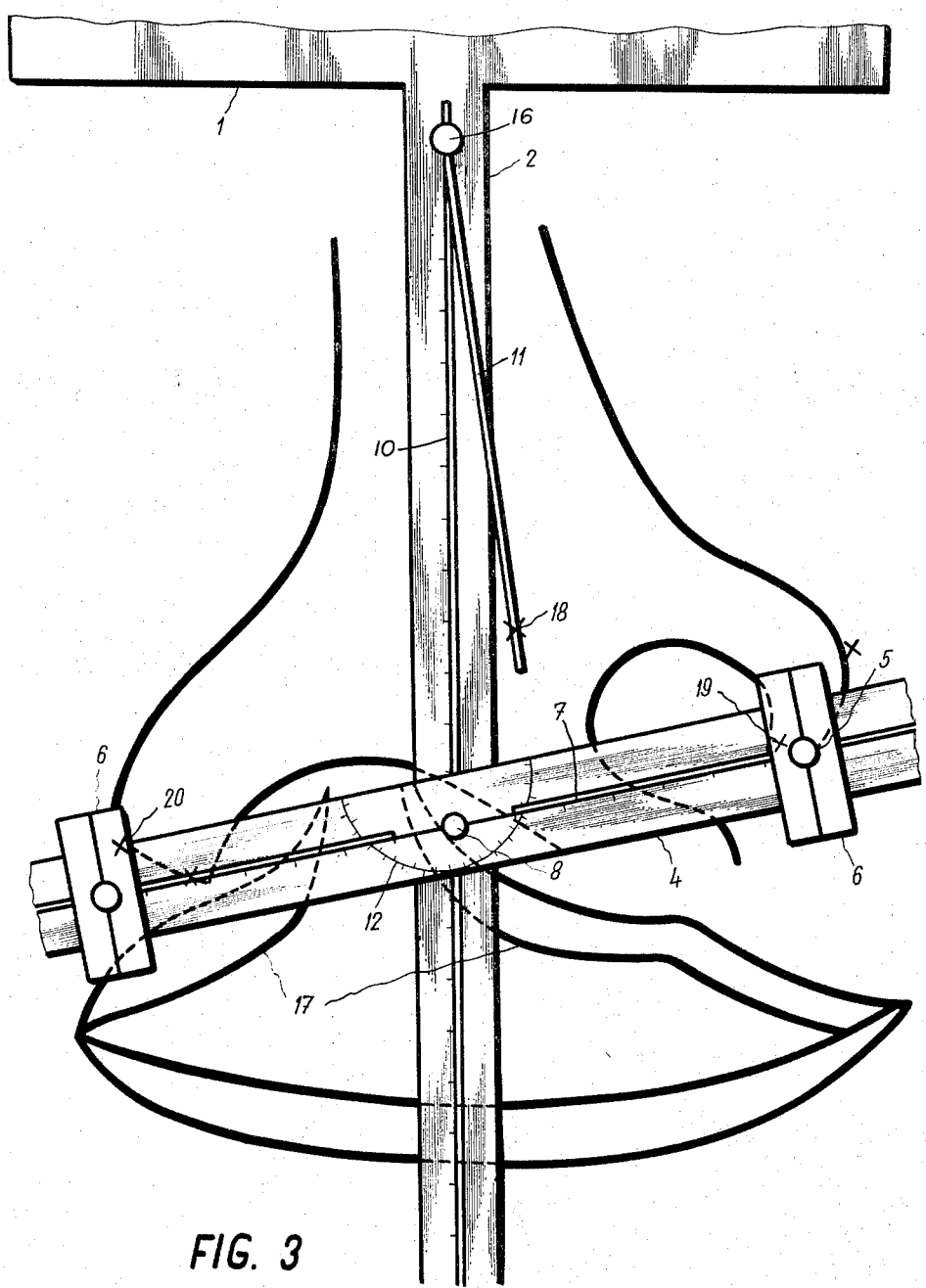
FIG. 3 indicates how the facemeter in accordance with the invention can be used to investigate a harelip and associated nose defects.

FIG. 3 shows the central part of the face with a harelip defect. This defect attacks the nose which becomes deformed in different ways: the nose wings do not lie in one plane, they lie in different depth of the face, the width of the wings is different on the right and left side, the ridge and axis of the nose are laterally deflected.

In the case illustrated, the fissure is on the right side of the lip 17. The device is applied to the face in such a manner that its medial line coincides with the ideal medial line of the face. The pointer 11 is deflected accurately in accordance with the direction of deflection 18 of the nose. The movable arm 4 is deflected, and the sliding piece 6 on the left side is placed accurately above the displacement of the wing 19 of the nose where it measures the depth of collapse of this nose wing. The sliding piece 6 on the right side is moved to the edge of the nose wing 20 and it measures the width of the right nose wing 20 from the central line.

The device permits one to measure simultaneously several cephalometric parameters: lateral deviation of the nose, lateral deviation of the nose ridge, wing width separately, width of the nose root, extent of collapse of the nose wings. It permits also anthropological measurements on the lip and the lower part of the face. It determines defects in this part objectively.

We claim:

1. A measuring device, particularly a facemeter for measuring the relationships between facial parts and the dimensions thereof, comprising a T-shaped frame having an upright arm and a stationary transverse arm, and being adapted to be placed frontally against a face, said upright arm being provided with a longitudinally extending elongated recess therein; an adjustable transverse arm journalled in said recess of said upright arm for rotation and for movement along said recess toward and away from said stationary transverse arm in a plane parallel to said frame, said adjustable transverse arm also being provided with a longitudinally extending elongated recess therein; height measuring means provided on said adjustable transverse arm for sliding movement along said including a pair of measuring members mounted on said adjustable transverse arm for sliding movement along sad recess thereof in a plane parallel to said frame, and for adjustable displacement in direction normal to said plane; first scale means extending along the respective recesses in parallelism therewith for respectively indicating the extent of movement of said adjustable transverse arm with reference to said upright arm, and of said members with reference to said adjustable transverse arm; second scale means provided on said adjustable transverse arm for indicating the angular position thereof with reference to said upright arm; and a pointer extending on said upright arm in direction from said stationary transverse arm toward said adjustable transverse arm, said pointer being journalled in said recess of said upright arm for rotation and for longitudinal movement in a plane parallel to said frame, and being adapted to cooperate with said second scale means for indicating thereon the angular positions of said pointer with reference to said upright arm.

2. A device as defined in claim 1; and further comprising attaching means provided on said frame for attaching the same to a face.

3. A device as claimed in claim 2, wherein said attaching means comprises a pair of longitudinally extending slots provided in said stationary transverse arm at opposite ends thereof, a strap adapted to be placed about a head, and a pair of adjusting screws each coupled to said strap and mounted in one of said slots for sliding movement therein.

4. A device as defined in claim 3, wherein said attaching means further comprises coupling means provided on said strap and adapted for coupling engagement with said adjusting screws.

5. A device as defined in claim 1; and further comprising a level mounted on said stationary transverse arm.

6. A device as defined in claim 5, wherein said level is a spirit level.

References Cited

UNITED STATES PATENTS

| 1,566,661 | 12/1925 | Essig | 33—174 |
| 2,107,534 | 2/1938 | Houser | 33—174 |
| 2,614,332 | 10/1952 | Zadrozny | 33—174 |

FOREIGN PATENTS 879,754   6/1953   Germany.

SAMUEL S. MATTHEWS, *Primary Examiner.*